Oct. 13, 1936.    M. B. SAWYER    2,057,503
LAMINATED CORE AND METHOD OF PRODUCING THE SAME
Filed Nov. 4, 1933
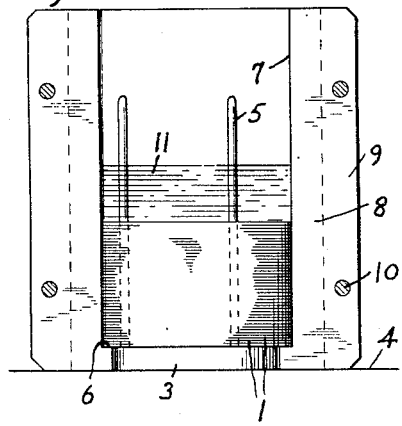
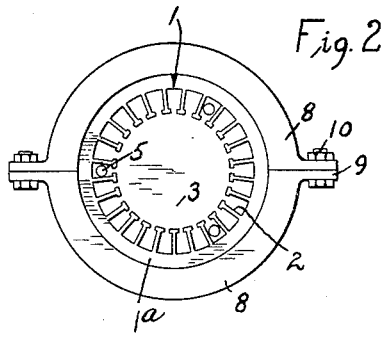
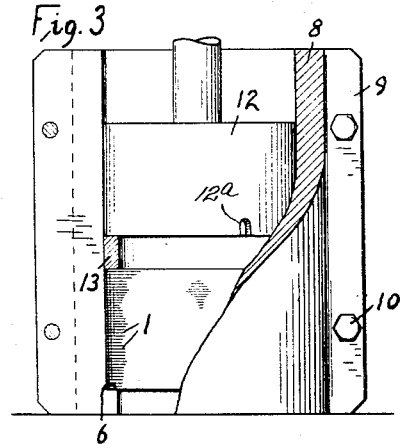
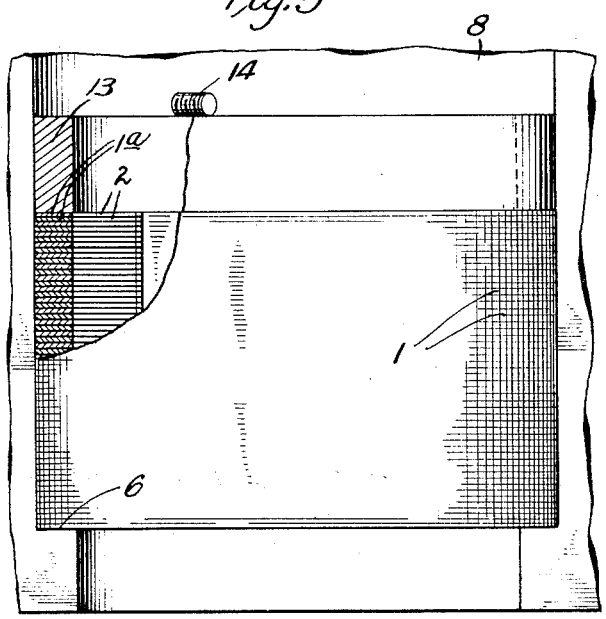
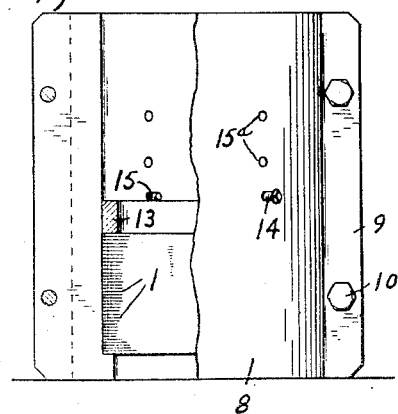
INVENTOR.
MARION B. SAWYER
BY R. W. Smith
ATTORNEY.

Patented Oct. 13, 1936

2,057,503

UNITED STATES PATENT OFFICE 2,057,503

LAMINATED CORE AND METHOD OF PRODUCING THE SAME

Marion B. Sawyer, Los Angeles, Calif., assignor to Sawyer-Reed Manufacturing Company, Los Angeles, Calif., a corporation of California Application November 4, 1933, Serial No. 696,732

9 Claims. (Cl. 172—36)

This invention relates to laminated cores for electro-magnets such as the field and armature windings of electric motors; and since a laminated structure may be employed for the field poles as well as the armature core of a D. C. motor, and is usual construction for both the rotor core and the stator of an A. C. motor, the following description of a laminated stator for an A. C. motor will be understood as being simply one typical embodiment, the invention being of a scope to include cores for electro-magnets, either field or armature, for either A. C. or D. C. motors.

It is the object of the invention to provide a laminated core in which high flux densities are permissible and generation of eddy currents is minimized, thereby avoiding excessive temperature rise and insuring maximum efficiency with a core of relatively small diameter.

It is a further object of the invention to build up the laminated core by an extremely simple process which materially reduces the cost of material and the investment in tools and equipment, and which provides for using the same equipment for conveniently making cores of different lengths for motors of different ratings.

More particularly it is the object of the invention to insulate and secure the stacked laminations in assembled relation so as to form a rigid core without riveting, welding or otherwise connecting the laminations in such manner as to short circuit the same, and with positive and adequate insulation between next adjacent laminations so as to insure high electrical resistance through the core.

Further objects of the invention will be readily understood from the following description of the accompanying drawing, in which:

Fig. 1 is a vertical section through a suitable jig, showing the method of stacking the laminations.

Fig. 2 is a transverse section on the line 2—2 of Fig. 1.

Fig. 3 is a view similar to Fig. 1 showing the method of longitudinally compressing the stacked laminations.

Fig. 4 is a similar view showing the method of securing the stacked laminations in assembled relation.

Fig. 5 is a fragmentary enlarged view similar to Fig. 4, showing the stacked laminations partly in axial section.

The illustrated embodiment of the invention shows the method of making a laminated stator for a small A. C. motor, the completed stator being shown at Fig. 5. The stator laminations are of usual material and construction, and each consists of a mild steel, relatively thin circular lamination 1, having a solid annular portion 1ᵃ at its outer periphery and having slots 2 in its internal periphery. The laminations are stacked to form a stator of the required length, with the slots 2 of the stacked laminations in longitudinal alinement so as to form longitudinal grooves for reception of the coils of the motor.

The laminations may be stacked in a jig such as shown at Figs. 1 to 4, and which includes a stacking jig and a retaining jig. The stacking jig comprises a base 3 adapted to rest upon a suitable support 4, and having upwardly projecting pins 5 which are circumferentially spaced to permit stacking the laminations on the pins, with the pins extending through the slots 2 of the laminations as shown at Fig. 2 so as to properly aline the stacked laminations. The retaining jig comprises an annular shell adapted to fit over the stacking jig and rest upon support 4, with the shell internally shouldered as shown at 6 to form a support for the stack of laminations which fit snugly in the bore 7 of the shell so that the retaining jig maintains alinement of the laminations and defines the external diameter of the stack. The shell is preferably sectional to permit ready removal from the stacked laminations, and for this purpose is shown as comprising semi-cylinders 8 which are flanged at 9, with the flanges adapted to receive retaining bolts 10 for detachably securing the sectional shell in assembled relation.

The retaining jig having been received over the stacking jig, the laminations 1 are stacked in the bore 7 as shown at Figs. 1 and 2, the proper number of laminations being employed to form a stator of desired length. While being stacked the laminations are coated at each face with a liquid medium, which when it has hardened forms an adhesive and an insulator film between next adjacent laminations for binding the laminations to one another so as to form a rigid stack with the laminations positively insulated from one another. The liquid coating may be applied by submerging the stacking jig in the liquid which is shown at 11 (Fig. 1), and then successively lowering the laminations into the liquid and stacking the same on the pins 5.

When the required number of laminations have been stacked upon the supporting shoulder 6, pressure is applied for compressing the stack, with the shell 8 maintaining the external diameter of the stack and the applied pressure squeezing out all but a very thin film of liquid from between next adjacent laminations. Pressure may be applied through the head 12 of a hydraulic press as shown at Fig. 3, and in practice a relatively heavy pressure, as for example approximately two tons, is employed in order to securely bind the laminations to one another and insure a rigid and solid stack.

After pressure has been applied the laminations are secured in their compressed, stacked relation, and for this purpose a collar 13 may be interposed between the stack of laminations and the hydraulic head 12 preparatory to compressing the laminations as shown at Fig. 3, and after the laminations have been compressed the collar 13 is locked in the jig 8. The collar 13 may be locked by pins 14 which are threaded through the wall of jig 8 so as to overlie the collar 13 as shown at Fig. 4, the threaded bores 15 for the locking pins being so spaced from the shoulder 6 that the locking pins may be received over the collar 13 when a predetermined number of laminations have been compressed to a predetermined degree. In order that the head 12 may hold the stacked laminations in compressed relation until the pins 14 have been inserted, the head 12 may be recessed as shown at 12ᵃ for reception of the inner ends of the pins, with said recesses extending upwardly from the lower surface of the head so that after the collar 13 has been locked in place the head 12 may be withdrawn. In order that stators of different length may be conveniently formed, threaded bores for the locking pins are preferably longitudinally spaced along the jig 8, with the threaded bores which are employed when forming various lengths of stators shown at 15ᵃ.

When a stack of laminations has been assembled and locked in jig 8 and the stacking jig has been withdrawn through the open lower end of the bore of the retaining jig, the excess liquid is drained from the retaining jig and the stack, while compressed in the retaining jig, is then baked so as to harden the film of liquid between next adjacent laminations. For this purpose the jig 8 may be placed in any suitable oven (not shown), and is subjected to a relatively high heat for an appreciable length of time. In practice a temperature of 120° C. has been employed for a period of approximately 8 hours.

After baking the assembled stack, the retaining jig is removed by displacing its separable sections, thereby producing the finished stator. The coating of liquid which has hardened between next adjacent laminations provides positive insulation which will minimize eddy currents, but the hardened film is so thin as to not appreciably weaken the structure but form a stator which is substantially as strong as an all metal construction. At the same time the hardened film between adjacent laminations binds the same to one another so as to form substantially as sturdy and rigid a structure as if the laminations had been welded or riveted together, but without short-circuiting the laminations as in the case of a riveted or welded assembly. Excessive rise in temperature is thus avoided, thereby permitting high flux densities and consequent greater efficiency without increasing the size of the stator.

It will be noted that when compressing the stack of laminations preparatory to and during baking, the collar 13 and the shoulder 6 engage only the outer peripheral solid annular portions 1ᵃ of the laminations, being clear of the slotted internal peripheral portions 2 of the laminations as shown at Fig. 5. In other words the cooperating collar and shoulder compress the solid annular portions 1ᵃ of the laminations, but exert no compressing stress directly upon the slotted portions 2 of the laminations. The solid annular portions 1ᵃ of the laminations are thus compressed and bound tightly together with a thin film of insulation therebetween while the slotted portions 2 of the laminations are not bound as tightly together. Consequently a rigid stator is insured by the tightly bound annular portions 1ᵃ of the laminations, but at the slotted portions 2 of this stator, where the flex density is higher than at its outer peripheral portion, and where consequently there is a greater tendency for eddy currents to be formed, the less tightly bound slotted portions of the laminations minimize such eddy currents.

As a result of the clamping means 13—6 being at the outer periphery of the stack of laminations so as to clear the bore of the stack, a further advantage is obtained in that while the stack of laminations is still clamped in the jig 8, the bore of the stack is unobstructed. The cores which are mounted in the slots 2 of the stator may thus be inserted while the stack of laminations is still clamped in the jig and before baking the stack.

The medium forming the binder and insulator between the laminations, may be any suitable high dielectric having great adhesive qualities and retaining these characteristics under temperature; and for convenience in uniformly coating the laminations, a medium is preferably employed which is normally liquid but which solidifies when subjected to heat. The binder is preferably such that when heated and hardened it becomes substantially infusible, so that when the laminated core is employed as the stator of a motor and is thus subjected to the high temperature which is generated by a motor when in operation, there will be no tendency of the binder to melt. In order that the binder may be normally liquid for uniformly coating the laminations, the binder is preferably a substance which is readily soluble whereby the solvent which is employed may diffuse the binding agent so that it reaches all parts of the surfaces of the laminations. As an instance of a suitable medium I have employed a solution comprising 50% by weight of resin and 50% by weight of solvent, being any one of the products described and claimed in U. S. Patents No. 1,800,295 of April 14, 1931, No. 1,800,296 of April 14, 1931, No. 1,870,453 of August 9, 1932, No. 1,870,454 of August 9, 1932, and No. 1,870,455 of August 9, 1932, consisting of polybasic acid and polyhydric alcohol combined with fatty acids. Another binder which may be used is chlorinated diphenyl resins, which give substantially the same results as the resins described in the above mentioned patents.

I claim:

1. A core for electro-magnets comprising metal laminations having solid annular outer peripheries and slotted inner peripheries, and a film of a dielectric between next adjacent laminations, the laminations being bound tightly together at their solid outer annular portions and being less tightly bound together at their inner slotted portions.

2. The method of forming a laminated core for an electro-magnet, which includes applying an adhesive dielectric to laminations which have solid annular outer peripheries, and slotted inner peripheries, stacking the laminations, and compressing the stack of laminations with the compressing means engaging only the outer peripheral portion of the stack.

3. The method of forming a laminated core for an electro-magnet, which includes applying an adhesive dielectric to laminations which have solid annular outer peripheries and slotted inner peripheries, stacking the laminations, compressing the stack of laminations with the compressing means engaging only the outer peripheral portion of the stack, and clamping the compressed stack of laminations with the clamping means engaging only the outer peripheral portion of the stack.

4. The method of forming a laminated core for an electro-magnet, which includes applying an adhesive dielectric to annular laminations, stacking and compressing the laminations so as to form an annular stack having an open bore, and clamping the compressed laminations with the clamping means engaging only the outer peripheral portion of the annular stack.

5. The method of forming a laminated core for an electro-magnet, which includes applying an adhesive dielectric to annular laminations, stacking and compressing the laminations so as to form an annular stack having an open bore, and clamping the compressed laminations with the clamping means clear of the bore of the annular stack and engaging only the outer peripheral portion of the annular stack.

6. The method of forming a laminated core for an electro-magnet, which includes applying an adhesive dielectric to laminations which have solid annular outer peripheries and slotted inner peripheries, stacking the laminations, and compressing the stack of laminations by directing a compressing force against only the solid annular outer peripheral portions of the stacked laminations.

7. The method of forming a laminated core for an electro-magnet, which includes applying an adhesive dielectric to laminations which have solid annular outer peripheries and slotted inner peripheries, stacking the laminations, and clamping the stack of laminations in compressed relation, with the clamping stress exerted against only the solid annular outer peripheral portions of the stacked laminations.

8. The method of forming a laminated core for an electro-magnet, which includes applying an adhesive dielectric to annular laminations which have slotted and solid annular portions radially one beyond another, stacking the laminations, and compressing the stack of laminations by directing a compressing force against only the solid annular portion of the annular stack.

9. The method of forming a laminated core for an electro-magnet, which includes applying an adhesive dielectric to annular laminations which have slotted and solid annular portions radially one beyond another, stacking the laminations, and clamping the stack of laminations in compressed relation, with the clamping stress exerted against only the solid annular portion of the annular stack.

MARION B. SAWYER.